United States Patent [19]

Tunoda et al.

[11] Patent Number: 4,524,923
[45] Date of Patent: Jun. 25, 1985

[54] FISHING SPINNING REELS

[75] Inventors: Kikuo Tunoda, Hiroshima; Kiyomi Ozaki, Fuchu, both of Japan

[73] Assignee: Ryobi Limited, Hiroshima, Japan

[21] Appl. No.: 375,206

[22] Filed: May 5, 1982

[30] Foreign Application Priority Data

May 25, 1981 [JP] Japan .............................. 56-76321[U]
May 25, 1981 [JP] Japan .............................. 56-76322[U]

[51] Int. Cl.³ ...................... A01K 89/01; A01K 89/02
[52] U.S. Cl. ................................................ 242/84.5 A
[58] Field of Search .................. 242/84.5 A, 84.5 R, 242/84.51 A, 84.51 R, 84.21 R, 84.2 G, 84.2 R, 84.1 J

[56] References Cited

U.S. PATENT DOCUMENTS 2,863,617 12/1958 Chapin et al. ............... 242/84.21 R
2,910,253 10/1959 Nurmse .......................... 242/84.5 A
2,981,495 4/1961 King ............................... 242/84.5 A
3,088,691 5/1963 Hull ................................ 242/84.5 A
3,255,981 6/1966 Wood ............................. 242/84.5 A
3,900,167 8/1975 Hull ................................ 242/84.5 A
4,238,085 12/1980 Jansson et al. ................ 242/84.2 G Primary Examiner—Billy S. Taylor

[57] ABSTRACT

Fishing spinning reel having a hollow main body having front and rear ends, a main shaft within the main body having a spool attached to its front end, a handle shaft rotatably mounted on the main body, a handle connected to the outer end of the handle shaft, a gear mechanism within the main body drivingly connecting the handle shaft and the main shaft, a drag knob telescoped over the handle shaft and disposed adjacent to the handle, a rotatable hollow shaft telescoped over the handle shaft and having the drag knob affixed to the outer end thereof, and a drag force generating mechanism connected between the rear end of the main body and the rear end of the main shaft and operated upon the rotation of said drag knob and hollow shaft.

5 Claims, 11 Drawing Figures

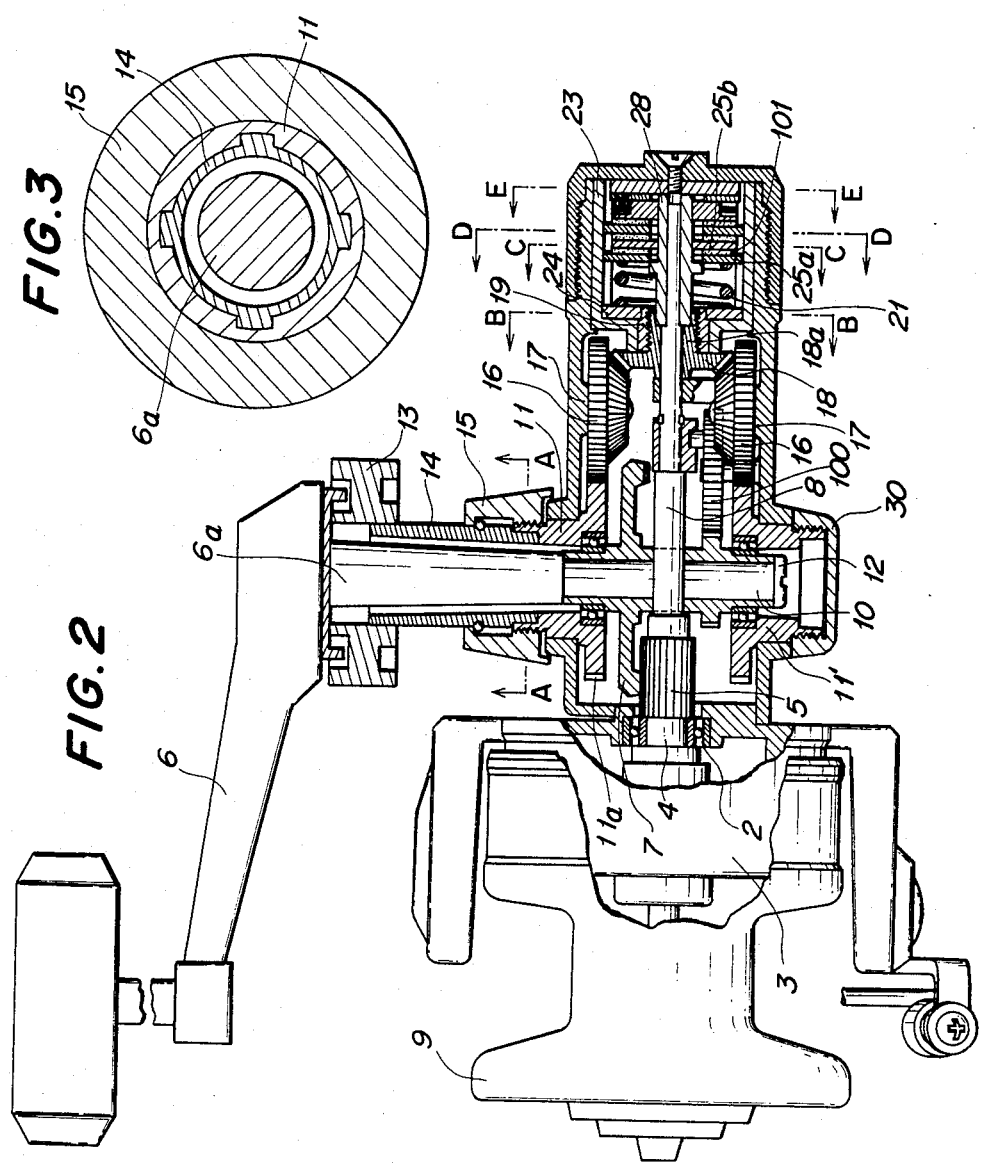

FISHING SPINNING REELS

BACKGROUND OF THE INVENTION

This invention relates to a fishing spinning reel, more particularly, to a drag mechanism thereof.

In the prior art drag mechanism a drag knob is mounted on the front end of a spool or the side surface of the rear portion of a main body, and accordingly, a fisher must leave his hand from the handle to operate the drag knob during taking up or paying off a fishing line. Therefore, the loss of time is caused by shifting the hand from the handle to the drag knob, which sometimes results in failing to catch a fish and/or cutting-off the fishing line especially when the drag force must be decreased due to the strong pulling force applied to the fishing line by the fish during taking-off operation.

SUMMARY OF THE INVENTION

It is therefore an object of this invention to provide an improved fishing spinning reel that can ensure timely operation of the drag mechanism.

Another object of this invention is to provide a fishing spinning reel capable of operating the drag mechanism without leaving the hand of the fisher from the handle.

Further object of this invention is to provide a fishing spinning reel capable of obtaining the large drag pressure with small movement of the drag knob.

According to this invention, there is provided a fishing spinning reel comprising, a main body, a main shaft connected to a spool, a master gear having a hollow shaft connected to the center thereof, a handle shaft received in said hollow shaft, a drag knob mounted on said handle shaft, a bush rotatably supported by said hollow shaft and rotated by said drag knob, and a drag force generating mechanism operated upon the rotation of said bush.

Another aspect of the invention is to provide a fishing spinning reel wherein said bush is provided with a gear portion, and which further comprises an intermediate gear rotatably secured to the main body, a bevel gear rotatably mounted on the main shaft, said intermediate gear being operatively connected between said gear portion of the bush and said bevel gear and a hollow cylinder mounted on said bevel gear and being moved in the axial direction upon the rotation of the bevel gear, thereby pressing or depressing the drag spring.

Further aspect of the invention is to provide a fishing spinning reel wherein said bush is provided with an eccentric cam portion, and which further comprises an intermediate v-shaped lever swingably secured to the main body and having a vertically bent portion at one side thereof and a boss slidably mounted on the main shaft, the other side of the v-shaped lever engaging said cam portion of the bush while the bent portion of said one side engages said boss and said boss is moved in the axial direction upon the rotation of the bush, thereby pressing or depressing the drag spring.

BRIEF DESCRIPTION OF THE DRAWINGS

Other objects and aspects of the invention will become apparent from the following description of embodiments with reference to the accompanying drawings in which:

FIG. 2 is a semi diagrammatical horizontal sectional view of FIG. 1;

FIGS. 3-7 are sectional views taken along lines A—A, B—B, C—C, D—D and E—E shown in FIG. 2, respectively;

FIG. 11 is a sectional view taken along a line F—F shown in FIG. 9.

DESCRIPTION OF THE PREFERRED EMBODIMENTS

Figure 1:
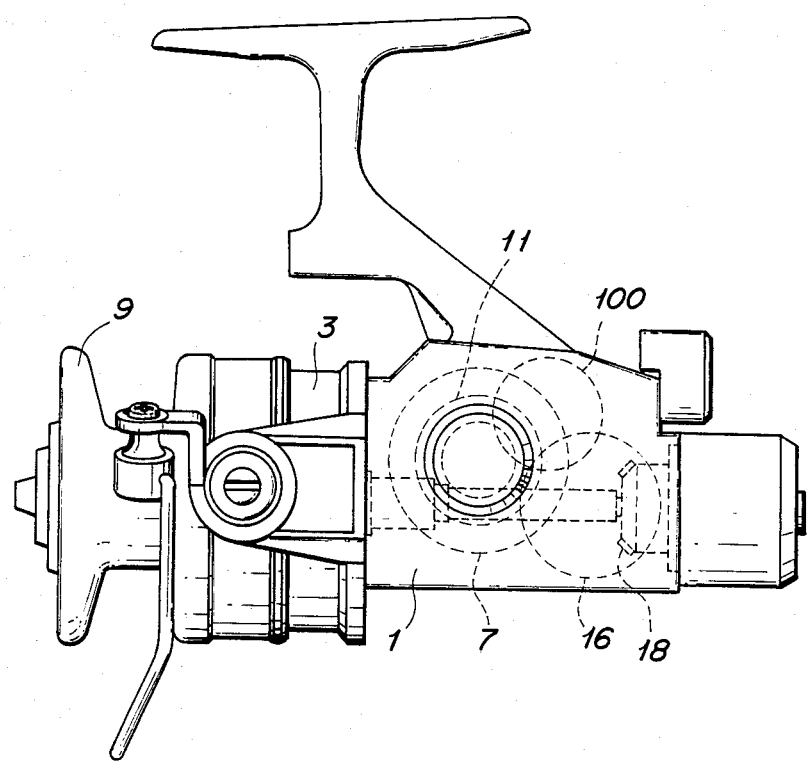
FIG. 1 is a side view of a fishing spinning reel embodying the invention.
Figure 4:
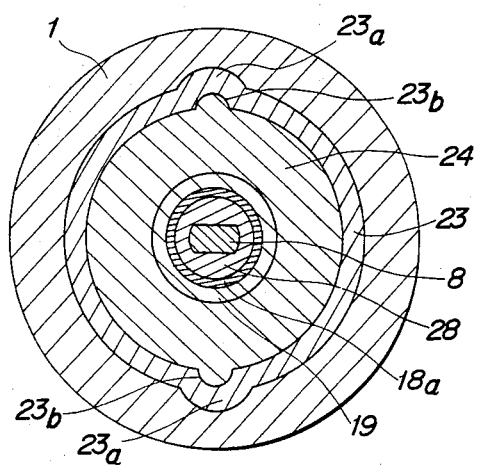
Figure 5:
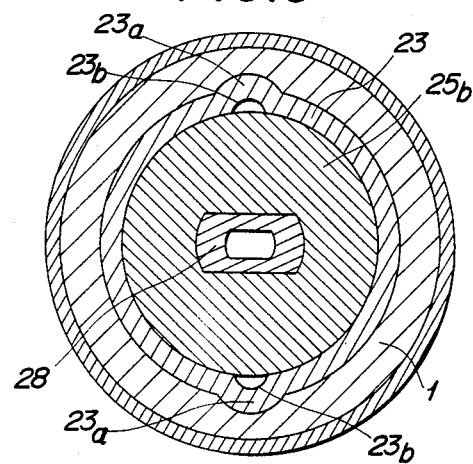
Figure 6:
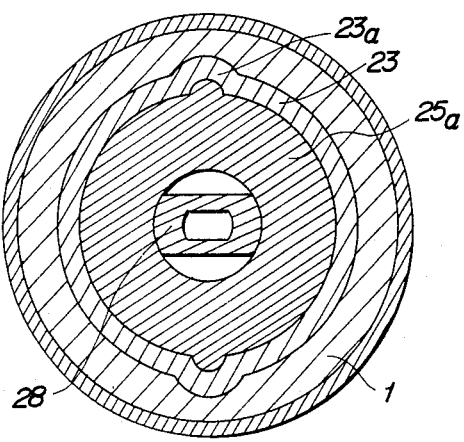
Figure 7:
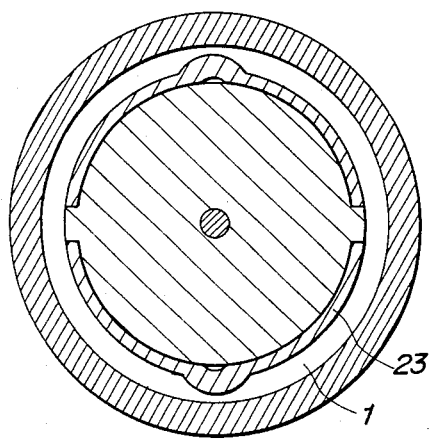
Figure 8:
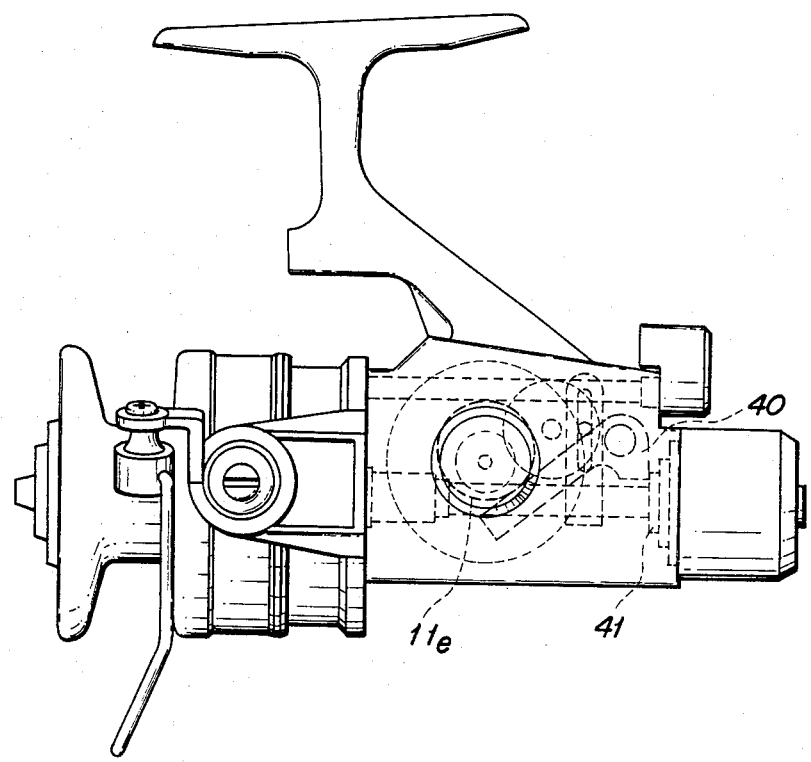
FIG. 8 is a side view of a fishing spinning reel showing another embodiment of the invention.

As shown in FIGS. 1 and 2, the fishing spinning reel of this invention comprises a reel body 1, a rotor 3 mounted on the front end of the reel body 1 and rotatably supported by a shaft 4 through a bearing 2, a spool 9 secured to a main shaft 8 extending through the shaft 4 and slidably supported by the reel body 1, and a master gear 7 rotated by a handle 6 and engaged with a pinion 5 provided at the inner end of the shaft 4. The main shaft 8 is operatively connected to the master gear 7 via an oscillating gear 100 and reciprocatingly moves in the forward and reward directions with the rotation of the handle 6.

The master gear 7 is connected to an inner portion 10 of a handle shaft 6a at the center thereof and a pair of bushes 11, 11' are relatively rotatably mounted through bearings at both ends of the portion 10 of the handle shaft 6a. The outer periphery of the inner side of each bush 11 is formed as a gear 11a.

The handle shaft 6a is rotated by the handle 6 extending coaxial of and through hollow shaft 14. The handle shaft 6a is detachably secured in the housing 1 by a screw 12 screwed into the end of portion 10 of the handle shaft 6a. A drag knob 13 is mounted on the outer end of the hollow shaft 14. The inner end of the hollow shaft 14 is detachably secured to the outer end of the bush 11 projecting out of the main body 1 by a screw fastener 15 so that the bush 11 rotates with the rotation of the knob 13. A cover 30 is threaded with the outer end of the opposite bush 11.

An inner housing 23 is installed in the reel body 1 at the rear end thereof while a drag bush 28 is mounted on the rear end of main shaft 8. A pair of ribs 23a, 23a are formed on the outer surface of the housing 23 and are engaged with a pair of grooves formed on the inner surface of the reel body 1, thereby preventing the rotation of the housing 23. A pair of grooves are formed on the inner surface of the housing 23 while the drag bush 28 has a rectangular cross section, and a plurality of drag washers 25a and 25b are alternatively mounted between the housing 23 and the bush 28 slidably in the axial direction. The washers 25a have a pair of radial extentions at the upper and lower periphery thereof which engage the grooves of the housing 23 and a circular opening at the center thereof which receives the drag bush 28 while the washers 25b have a rectangular opening at the center thereof which engages the drag bush 28. A plurality of friction discs 101 are inserted between washers 25a and 25b.

A bevel gear 18 is rotatably mounted on the main shaft 8 forwardly of the front end of drag bush 28. The rotation of the bush 11 is transmitted to the bevel gear 18 through one of a pair of intermediate gears 16, 16 which are rotatably secured to the right and left inner surfaces of the reel body 1 at the bosses 17, 17 thereof. The outer surface of the hub 18a of the bevel gear 18 is threaded and a hollow cylinder 19, the inner surface of which is also threaded, is coupled and engaged with the hub 18a of the bevel gear 18.

A washer 24 having a pair of radial extensions at the upper and lower periphery thereof and a cylindrical opening at the center thereof is mounted between the inner housing 23 and the cylinder 19. The extensions on the washer 24 engages the grooves 23b of the housing 23 while the cylinder 19 is non-rotatably secured to the center opening of the washer 24, thereby preventing the rotation of the cylinder 19. The washer 24 may be formed as a unit with the cylinder 19.

A spring 21 is arranged between the washer 24 and the washers 25a, 25b for urging the latters to the axial direction.

According to the fishing spinning reel as above constructed, when the drag knob 13 is rotated, the bush 11 is rotated via the hollow shaft 14 and the rotation of the drag gear 11a is transmitted to the bevel gear 18 through the intermediate gear 16. Upon the rotation of the bevel gear 18, since the rotation of the cylinder 19 is prevented by the washer 24, cylinder 19 moves in the axial direction so that the spring 21 is pressed or depressed by the washer 24 secured to the cylinder 19. When the spring 21 is pressed to the unit in the axial direction, the friction force between the washers 25a and 25b becomes so large that the rotation of the main shaft 8 is prevented, however, the main shaft 8 is allowed to rotate by the depression of the spring 21 when the fishing fish line is strongly tensioned by the fish, thereby paying out the string.

FIGS. 8-11 show the another embodiment of this invention.

Figure 9:
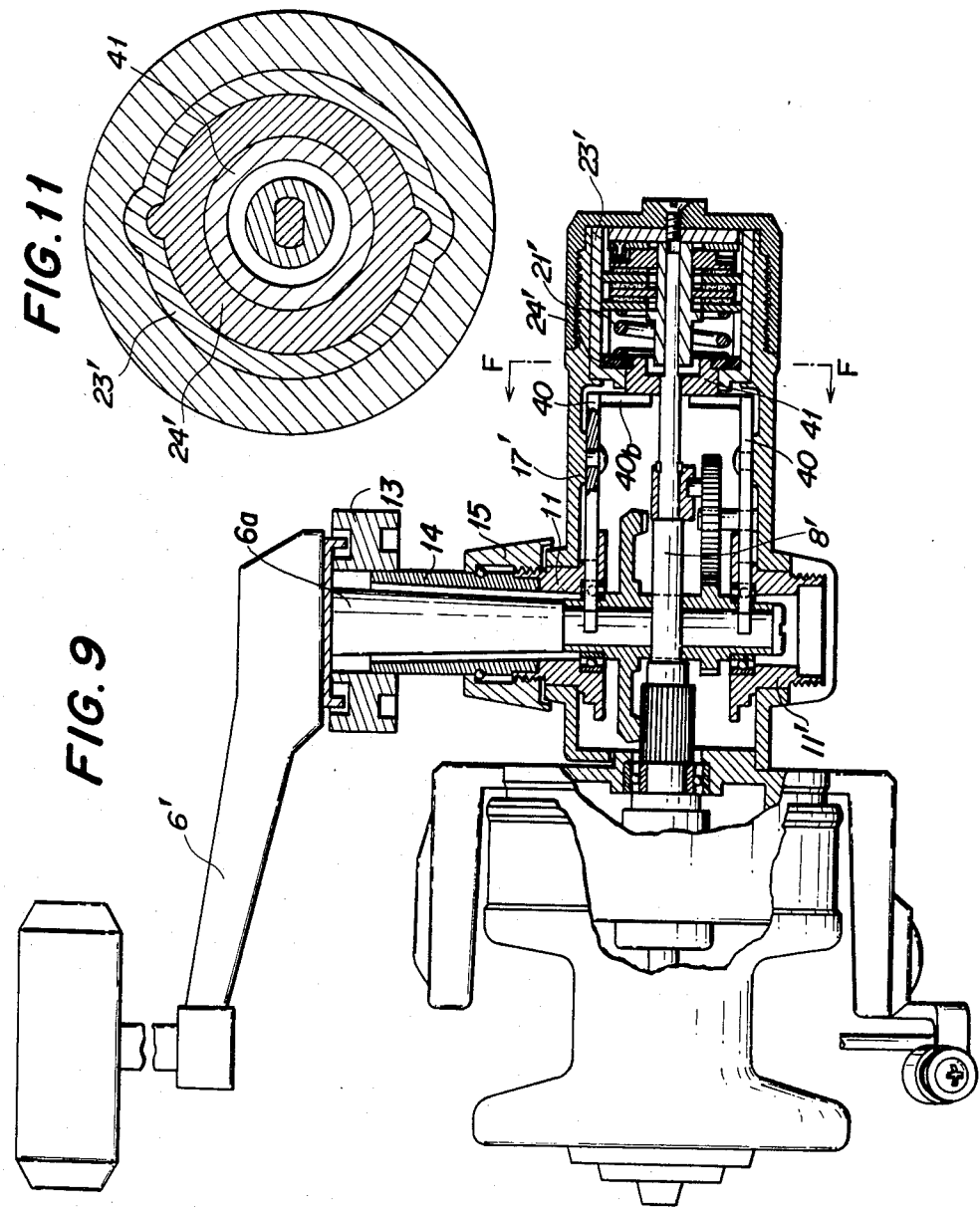
FIG. 9 is a semi diagrammatical horizontal sectional view of FIG. 8.
Figure 10:
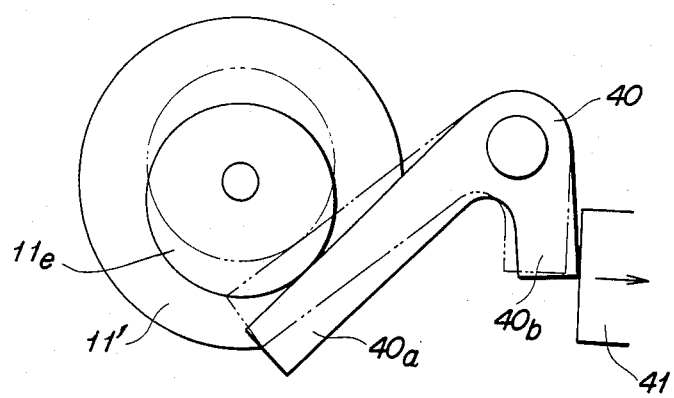
FIG. 10 shows the relation of a bush, a v-shaped lever and a boss.

In this embodiment, the torque of the handle 6' is transmitted to the drag spring 21' through the mechanism shown in FIG. 9. The torque of the handle 6' is transmitted to the bush 11 having an eccentric cam portion 11e. The eccentric cam portion 11e is operatively engaged with one side 40a of one of a pair of v-shaped levers 40, 40 supported by the boss 17', 17' projected from the right and left inner surfaces of the reel body 1'. The other side 40b of the lever 40 is bent downwardly at the intermediate portion thereof. A cylindrical boss 41 is slidably mounted on the main shaft 8' and the washer 24' is arranged between the inner housing 23' and the boss 41, the front end of which is engaged with the bent portion of the other side 40b of the lever 40. In the above construction, the lever 40 is swung with the rotation of the eccentric cam 11e of the bush 11' and the bent portion 40b of the lever 40 urges the boss 41 to slide in the axial direction. Upon the movement of the boss 41, the washer 24' presses the spring 21' so that the friction power between the washers 25'a and 25'b increases. Thus, the drag force is increased.

As above described, according to the fishing spinning reel embodying this invention, as the drag knob 13 is mounted on the handle shaft 6a near the handle 6, it is possible to operate the drag knob 13 without requiring the hand of the fisher to leave the handle 6 when a strong pulling force by the fish is applied to the fish line. Moreover, as the torque of the drag knob 13 is transmitted through the gear construction or the v-shaped lever 40, the large drag pressure can be obtained with small movement of the drag knob 13 by adjusting the gear ratio of the gear construction or the utilization of the leverage of the lever 40.

Accordingly, it is possible to quickly respond to the movement of the fish while the fishing string is being taken up.

Moreover, as the drag knob 13 is connected to the outer end of the bush 11 which projects out of the main body 1 by the screw fastener 15, and the handle shaft 6a is secured at its lower end portion 10 to the center of the master gear 7 by the screw 12 and further the bushes 11, 11' and the mechanism connecting them are symmetrical, the position of the handle 6 can be easily changed between the right and left sides of the main body 1.

What is claimed is:

1. A fishing spinning reel comprising:
   a hollow main body having front and rear ends;
   a main shaft within the main body having a spool attached to its front end;
   a handle shaft rotatably mounted on the main body;
   a handle connected to the outer end of the handle shaft;
   a gear mechanism within the main body drivingly connecting the handle shaft and the main shaft;
   a drag knob telescoped over the handle shaft and disposed adjacent to the handle;
   a rotatable hollow shaft telescoped over the handle shaft and having the drag knob affixed to the outer end thereof; and
   a drag force generating mechanism connected between the rear end of the main body and the rear end of the main shaft and operated upon the rotation of said drag knob and hollow shaft, said drag force generating mechanism comprising:
   a drag bush mounted on the rear end of the main shaft;
   an inner housing installed in the rear end of the main body;
   a plurality of drag washers arranged between said inner housing and said drag bush, some of which having a circular opening at the center thereof which receives said drag bush and a pair of radial projections at the outer peripheral thereof which slidably engage a pair of grooves of the inner housing while the other drag washers have a rectangular opening at the center thereof which engages the drag bush having a rectangular cross section;
   a plurality of friction discs inserted between said drag washers; and
   a drag spring forcing said washers and friction discs to the axial direction.

2. The fishing spinning reel according to claim 1, wherein said bush is provided with a gear portion, and wherein said drag force generating mechanism further comprises an intermediate gear rotatably secured to the main body, a bevel gear rotatably mounted on the main shaft, said intermediate gear being operatively connected between said gear portion of the bush and said bevel gear and a hollow cylinder mounted on said bevel gear and being moved in the axial direction upon the rotation of the bevel gear, thereby pressing or depressing the drag spring.

3. The fishing spinning reel according to claim 2 wherein said bush is provided with an eccentric cam portion, and said drag force generating mechanism further comprises an intermediate v-shaped lever swingably secured to the main body and having a vertically bent portion at one side thereof and a boss slidably mounted on the main shaft, the other side of the v- shaped lever engaging said cam portion of the bush while the bent portion of said one side engaging said boss and said boss being moved in the axial direction upon the rotation of the bush, thereby pressing or depressing the drag spring.

4. The fishing spinning reel according to claim 2, wherein said hollow shaft extends along the handle shaft, the drag knob being detachably connected to the outer end of the hollow shaft which projects out of the main body, and a pair of bushes and intermediate gears are provided at both inner side surfaces of the main body, thus enabling the changing of the handle location between right and left sides of the main body.

5. The fishing spinning reel according to claim 3, wherein said drag knob is provided with a collar extending along the handle shaft and detachably connected to the outer end of the hollow shaft projecting out of the main body, and a pair of bushes and intermediate levers are provided inwardly of the inner side surfaces of the main body, thus enabling the changing of the handle location between right and left outer sides of the main body.

* * * * *